United States Patent
Tsutsui et al.

(10) Patent No.: US 7,309,108 B2
(45) Date of Patent: Dec. 18, 2007

(54) HEADREST DEVICE FOR VEHICLE SEAT

(75) Inventors: Takao Tsutsui, Akishima (JP); Katsuhiko Sasaki, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 422 days.

(21) Appl. No.: 10/993,350

(22) Filed: Nov. 22, 2004

(65) Prior Publication Data

US 2006/0108851 A1    May 25, 2006

(51) Int. Cl.
*B60N 7/36* (2006.01)
(52) U.S. Cl. .................................... 297/410
(58) Field of Classification Search ............... 297/410, 297/391, 411.36; 403/109.5, 315–317; 249/118, 249/407, 408
See application file for complete search history.

(56) References Cited

U.S. PATENT DOCUMENTS

| | | | | |
|---|---|---|---|---|
| 3,498,672 A | * | 3/1970 | Leichtl | 297/410 |
| 3,544,162 A | * | 12/1970 | Uchiyamada et al. | 297/410 |
| 3,608,965 A | * | 9/1971 | Cziptschirsch et al. | 297/410 |
| 4,483,565 A | * | 11/1984 | Terui et al. | 297/410 |
| 4,679,850 A | * | 7/1987 | Bianchi et al. | 297/410 |
| 5,775,777 A | * | 7/1998 | Delling | 297/410 |
| 5,860,703 A | * | 1/1999 | Courtois et al. | 297/410 |
| 6,056,364 A | * | 5/2000 | De Filippo | 297/410 |
| 6,655,742 B1 | * | 12/2003 | Ozaki | 297/410 |
| 6,742,846 B1 | * | 6/2004 | Isaacson | 297/410 |
| 7,121,626 B2 | * | 10/2006 | Akehi et al. | 297/410 |

\* cited by examiner

*Primary Examiner*—Peter R. Brown
(74) *Attorney, Agent, or Firm*—Browdy and Neimark, PLLC

(57) ABSTRACT

A headrest device of a vertically movable type including a headrest body, a stay element and a lock mechanism provided on a seat back of a seat. The lock mechanism includes a lock plate movably disposed therein and a biasing means for normally biasing said lock plate in a locking direction. The stay element is slidably connected with the lock mechanism so as to be vertically movable and has a non-linearly profiled surface region defined in a surface portion thereof with which said lock plate is biased by said biasing means to frictional contact. Such formation of non-linearly profiled surface region is effective in preventing a friction noise from being generated between the lock plate and the stay element.

3 Claims, 4 Drawing Sheets

HEADREST DEVICE FOR VEHICLE SEAT

BACKGROUND OF THE INVENTION

1. Field of the Invention

The present invention relates to a headrest for use on a vehicle seat, which is of a vertically movable type being capable of its height adjustment, and in particular to a headrest device of that type having a lock mechanism provided therein.

2. Description of Prior Art

Most of headrests mounted on vehicle seats are capable of its height adjustment. Hitherto, this height adjustable type of headrest is mounted via vertically extending headrest stays upon the top of a seat back of vehicle seat. According thereto, the headrest body can be slidingly moved in vertical direction and locked to a desired degree of height for supporting a head of seat occupant by means of a lock device.

Referring to FIGS. 2 and 3 in conjunction with FIG. 1, such conventional headrest device will now be described. As shown, the conventional headrest device (HD') is comprised of a headrest body (H), a pair of first and second headrest stays (1' in FIG. 3) and (1), a pair of first and second holders (P') (P), and a lock mechanism (M) provided in the first headrest holder (P). As shown, each of the first and second holders (P') (P) is basically formed by a head portion (PT) and a vertical support portion (PL) extending continuously from the head portion (PT), with a through-hole (PLh) defined in and through both of the head and vertical support portions (PT) (PL).

The first and second holders (P) (P') are fixedly attached to the respective two support brackets (B) (B) fixed on the top horizontal portion of a seat back frame (F). The first headrest stay (1') is formed with a plurality of lock notches (11) and a lowest removal prevention notch (10) in one lateral surface (12') thereof. The two headrest stays (1') (1) may be slidably inserted in and through the respective through-holes (PH) of the first and second holders (P) (P').

The lock mechanism (M) is provided in the head portion (PT) of the first holder (P). Designation (M1) denotes an operation portion of the lock mechanism (M), which is defined in the holder head portion (PT) for locking and unlocking operation to be described later.

As shown in FIG. 2, the head portion (PT) comprises a core member (22) and a cap cover portion (21) which covers the core member (22), excepting the operation portion (M1) of the I lock mechanism (M). As shown, formed in the core member (22) are a vertical through-bore (22H) corresponding to the foregoing through-hole (PH) and a horizontally extending cavity (22H-1). The afore-said lock mechanism (M) comprises a horizontal lock plate portion (20A) having a lock hole (20H) formed therein, a lock operation button portion (20) integrally connected with that horizontal lock plate portion (20A), and a biasing spring (24) wound about a horizontal guide rod portion (23). The horizontal lock plate portion (20A) is slidably inserted in the horizontally extending cavity (22H-1) so as to be movable in a direction transversely of the vertical through-bore (22H). Normally, the horizontal lock plate portion (20A) is biased by the spring (24) in a locking direction toward the right side in the drawings.

As also seen in FIG. 2, the first headrest stay (1') is slidably inserted in and through the through-bore (22H), lock hole (20H) and through-bore of the holder's vertical support portion (PL). In particular, the lowest removal prevention notch (10) of the headrest stay (1') is shown to be engaged with the lock hole (20H), thereby locking the stay (1') or the headrest body (H) to a highest level, while positively preventing the stay (1') against removal from the holder (P). This locked engagement is ensured by the foregoing biasing force of the spring (24) which efforts to retain the lock plate (20A) in the locking position shown in the FIG. 2 where the lock hole (20H) is positively engaged with the notch (10). Under this locked state, if it is desired to unlock the stay (1'), a user has only to push the operation button portion (20A) in an unlocking diction toward the left side in the drawings. By doing so, the lock hole (20H) is disengaged from the lock notch (10) and displaced to a point coaxially aligned with both through-bores (22H) (PLh), so that both two headrest stays (1) (1') may be moved vertically through the respective two holders (P') (P). Hence, the user can move the headrest body (H) as well as the stays (1) (1') vertically though the holders (P') (P) and also can adjustably lock them to a desired level by allowing the lock hole (20H) to be engaged with a selected one of the lock notches (11).

The above-described conventional headrest device (HD'), however, has been with such a problem that, as shown in FIG. 3, when the stay (1') is moved vertically while the lock plate (20) is set in the unlocking position, the edge (20He) of the lock hole (20H) is in a frictional contact with one rectilinear lateral surface portion (12) of the stay (1'), and consequently, an unpleasant friction noise generates from therebetween. This is based on the reason that there is a spacing (22H-2) between the lock plate (20) and the horizontally extending cavity (22H-1), and thus, with movement of the stay (1') in upward and downward directions (U) (D), the edge portion (at 20He) of the lock hole (20H), which is in frictional contact with the rectilinear lateral surface portion (12) of the stay (1'), is subjected to vibration in the corresponding upward and downward directions (U1) (D1), and further, a constant friction is caused between the edge (20He) and rectilinear lateral surface portion (12), which means no change in friction therebetween and therefore a certain friction noise clearly generates therefrom. In particular, when the stay (1') moves a relative long distance in either the upward or downward direction, a considerable amount of the friction noise generates.

SUMMARY OF THE INVENTION

In view of the above-stated drawbacks, it is a purpose of the present invention to provide an improved headrest which effectively prevent generation of a friction noise from between a lock plate and headrest stay.

In order to achieve such purpose, a headrest device of a vertically movable type in accordance with the present invention is basically comprised of:

- a lock mechanism provided on the seat back, the lock mechanism including a lock plate movably disposed therein and a biasing means for normally biasing the lock plate in a locking direction;
- a headrest body;
- a stay means for supporting the headrest body upon the seat back, the stay means being slidably connected with the lock mechanism so as to be vertically movable, thereby allowing the headrest body to be adjusted in height via the stay means with respect to the seat back; and the stay means having a non-linearly profiled surface region defined in a surface portion thereof with which the lock plate is biased by the biasing means to frictional contact.

Accordingly, the non-linearly profiled surface region is effective in causing change in friction with respect to the lock plate, thereby insuring to avoid constant friction between the lock plate and such surface region. Thus, when moving the stay means in the upward and downward directions, no unpleasant friction noise is generated from contact of the lock plate with the stay means.

In one aspect of the present invention, the non-linearly profiled surface region may be formed in an undulating fashion in the longitudinal direction of the stay means, and the non-linearly profiled surface region may comprise a plurality of protrudent portions and a plurality of recessed portions, such that the plurality of protrudent portions and the plurality of recessed portions are alternately defined in the surface portion of the stay means.

In another aspect of the invention, the non-linearly profiled surface region may comprise a plurality of curvilinearly recessed portions and a plurality of rectilinear portions, such that the plurality of curvilinearly recessed portions and the plurality of rectilinear portions are alternately defined in the surface portion of the stay means along the longitudinal direction of the stay means.

In still another aspect of the invention, the non-linearly profiled surface region may comprise a plurality of gently curvilinearly recessed portions and a plurality of narrow protrudent portions, such that the plurality of gently curvilinearly recessed portions and the plurality of narrow protrudent portions are alternately defined in the surface portion of the stay means along the longitudinal direction of the stay means.

In yet another aspect of the invention, the non-linearly profiled surface region comprises a downwardly tapered convex surface region which is defined in the surface portion of the stay means along the longitudinal direction of the stay means.

In yet still another aspect of the invention, the non-linearly profiled surface region comprises a downwardly tapered concave surface region which is defined in the surface portion of the stay means along the longitudinal direction of the stay means.

Other features and advantages of the present invention will become apparent from reading of the descriptions, hereinafter, with reference to the annexed drawings.

DETAILED DESCRIPTION OF PREFERRED EMBODIMENTS OF THE INVENTION

Figure 1:
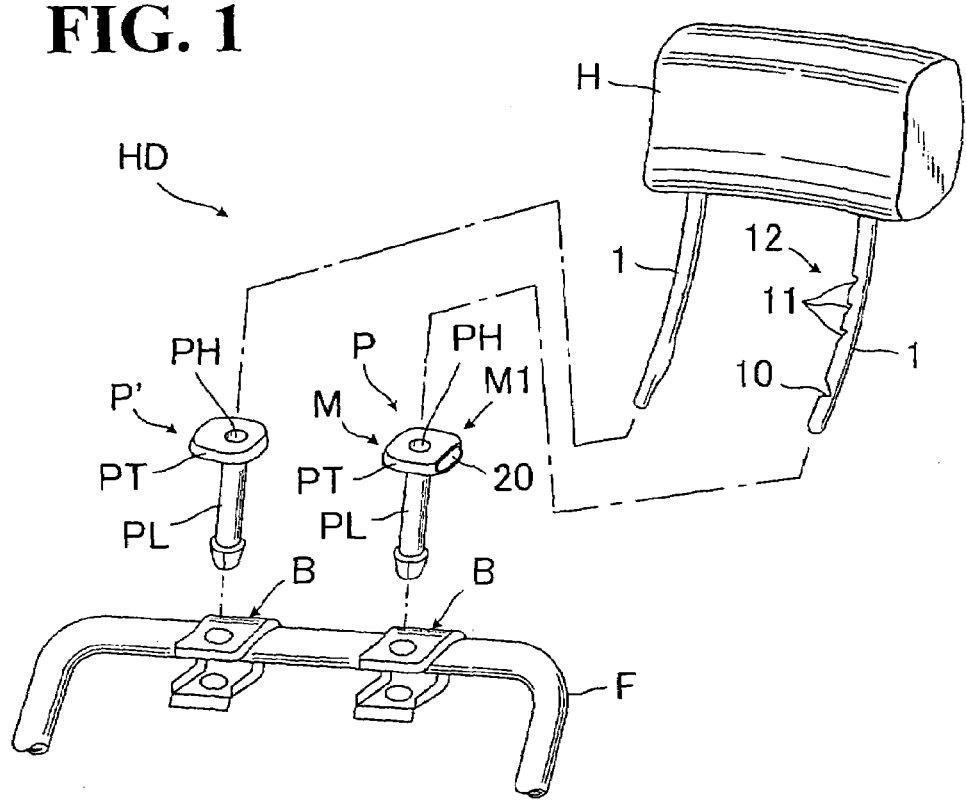
FIG. 1 is a partly broken exploded perspective view of the headrest device in accordance with the present invention.
Figure 2:
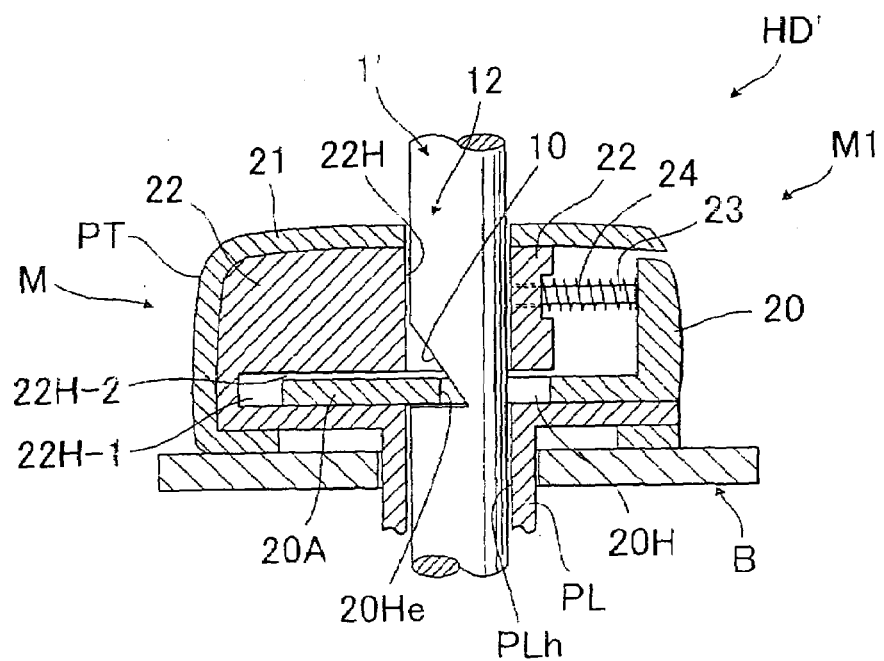
FIG. 2 is a fragmentary sectional view showing a lock mechanism and headrest stay of the headrest device.
Figure 3:
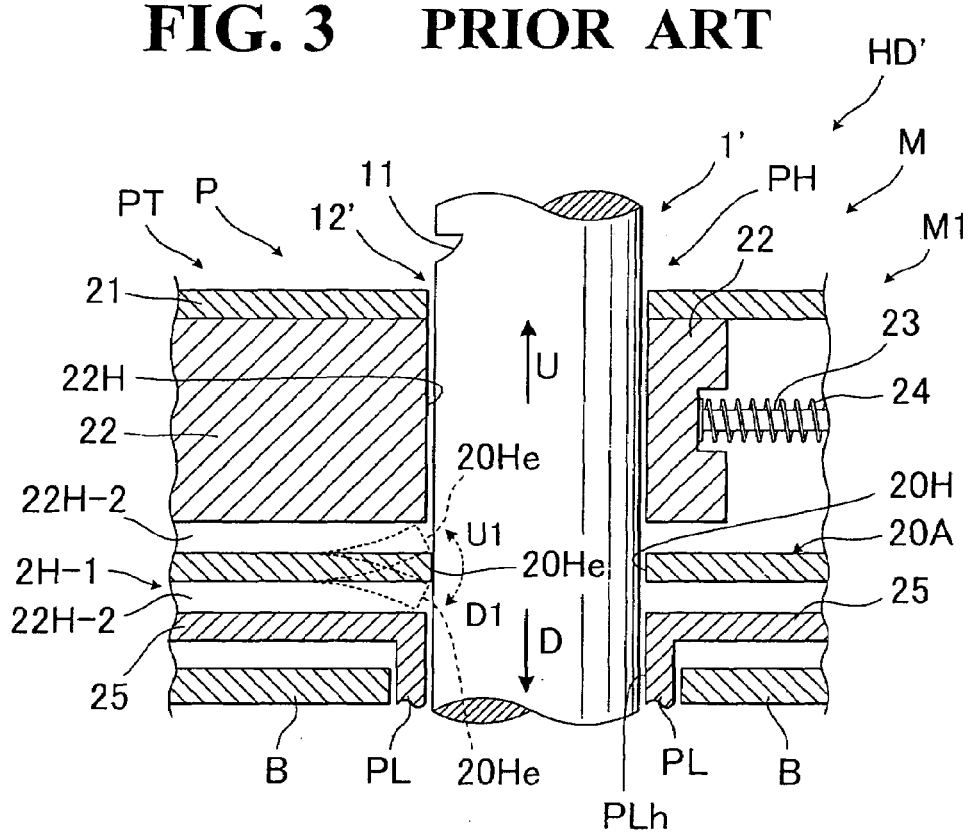
FIG. 3 is a fragmentary sectional view of a prior art headrest device which shows its lock mechanism and headrest stay.

Referring now to FIG. 1 and particularly to FIGS. 4 through 8, there are illustrated non-distinctive exemplary embodiments, each showing an alternative mode of headrest device (HD) within one inventive concept and gist of the present invention.

First of all, the headrest device (HD) in accordance with the present invention is substantially identical in structure to the prior-art headrest device described in the description of prior art, excepting the headrest stay (1). Of course, the headrest holder (P) having the lock mechanism (M) is used in the present invention, the lock mechanism (M) including the movable lock plate (20A). Hence, any further detailed description is omitted with regard to common parts and elements between the conventional headrest device (HD') and a headrest device (HD), and all like designations to be used hereinafter correspond to all like designations given in the prior art description.

As described earlier, normally, the workable portion of headrest stay is rectilinear, and, in such rectilinear portion of the stay, a plurality of lock notches (at 11) are formed in order to not only allow smooth sliding movement of the stay though the holder (P), but also allow for easy engagement and disengagement of the lock hole (20H) of the lock plate (20) with and from a selected one of the lock notches.

In accordance with the present invention, a nonlinearly (or unevenly) profiled surface region (C) is defined in the above-discussed rectilinear portion of conventional headrest stay to provide a novel headrest stay (S). Specifically, the headrest stay (S) in the present invention includes such nonlinearly profiled surface region (C) defined in one rectilinear lateral surface portion (12) thereof, wherein such one lateral surface portion (12) is to be contacted with the edge (20He) of the lock hole (20H) associated with the lock plate (20).

Figure 4:
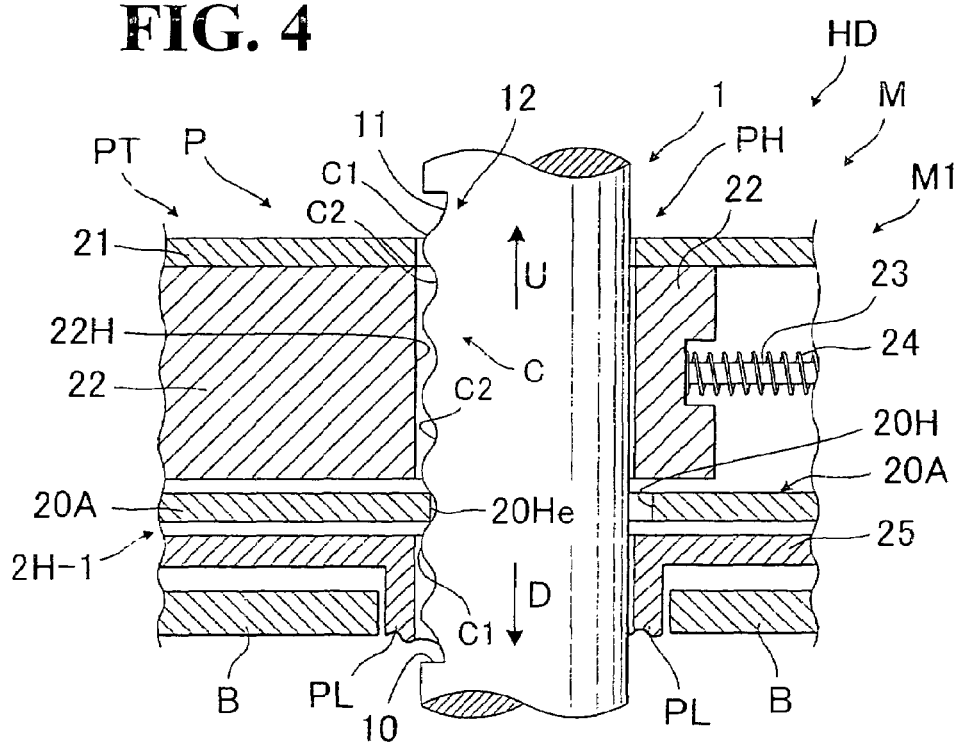
FIG. 4 is a fragmentary sectional view showing a first mode of the headrest device of the present invention.

FIG. 4 shows a first alternative mode of the foregoing nonlinearly profiled surface region (C), which is of a wavy or undulating shape. Namely, in this mode, a plurality of protrudent portions (C1) and a plurality of recessed portions (C2) are formed alternately in the rectilinear lateral surface portion (12) of the stay (1) along the longitudinal direction. Each of the protrudent and recessed portions (C1) (C2) is not large in dimensions but minute to a proper degree as will be explained below. Those portions (C1) (C2) in the aggregate provide a generally wavy or undulating formation in the rectilinearly extending longitudinal portion of the stay (S). Thus, such minute undulating portion defined by the protrudent and recessed portions (C1) (C2) is effective in causing change in friction between the lock hole edge (20He) and that particular undulating portion, thereby insuring to avoid constant friction therebetween, which is a cause for generating friction noise therefrom. Therefore, when moving the headrest stay (1) in the upward and downward directions (U) (D), no unpleasant friction noise is generated from contact of the lock hole edge (20He) with the lateral surface portion (12) of the stay (1).

The dimensions of each recessed portion (C2) may be properly set, depending on a thickness of the lock plate (20A), in order to prevent generation of objectionable friction noise from between the recessed portion (C2) and the lock plate (20A). For example, experiments show that, if the lock plate (20A) has approx. 1.2 mm thickness, a most suited condition of the recessed portions (C2) for preventing such objectionable friction is such that each of them should be 0.7 mm in depth and 12 mm in length, and that a pitch between one and another recessed portions (C2) (C2) be approx. 20 mm.

Further, since those protrudent and recessed portions (C1) (C2) are simply formed in a surface of rectilinear portion of headrest stay, the headrest stay (1) is quite easy to form at a low cost.

Figure 5:
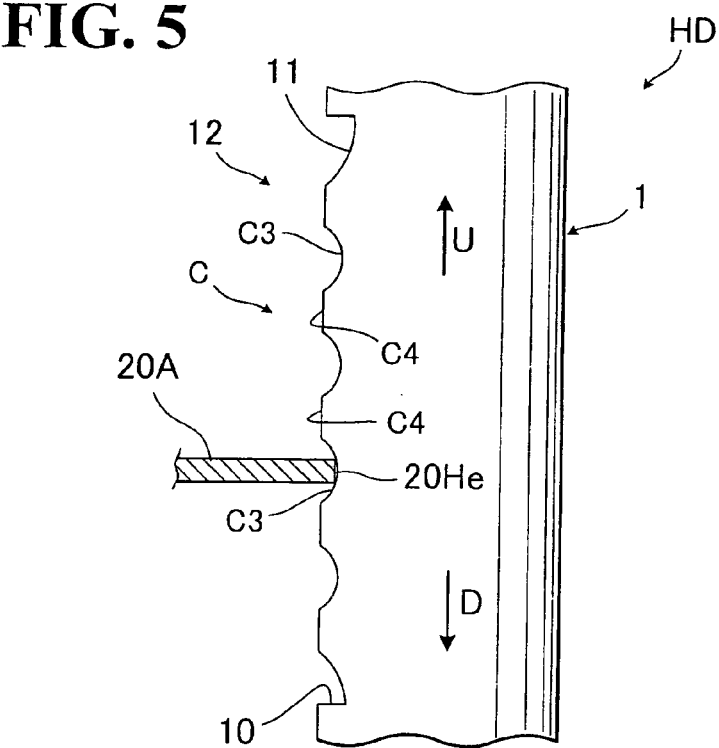
FIG. 5 is a partly broken side view showing a second mode of the headrest device of the present invention.

FIG. 5 shows a second alternative mode of the non-linearly profiled surface region (C) to provide the headrest stay (1). According thereto, a plurality of curvilinearly recessed portions (C3) and a plurality of rectilinear portions (C4) are alternately defined in the rectilinear lateral surface portion (12) of conventional headrest stay. As shown, such one lateral surface portion (12) is a local area with which the edge (20He) of the lock hole (20H) of lock plate (20A) is in a frictional contact. In this case also, those portions (C3) (C4) are relatively minute and effective in causing change in friction between the lock hole edge (20He) and such uneven portions (C3 and C4), thereby insuring to avoid constant friction therebetween. Therefore, when moving the headrest stay (1) in the upward and downward directions (U) (D), no unpleasant friction noise is generated from contact of the lock hole edge (20He) with the lateral surface portion (12) of the stay (1).

The dimensions of each recessed portion (C3) may be properly set, depending on a thickness of the lock plate (2) and a pitch between the curvilinearly recessed portions (C3) and rectilinear portions (C4) be properly set, with a view to preventing the generation of objectionable friction noise from among the recessed portion (C3), rectilinear portion (C4) and lock plate (20A).

Figure 6:
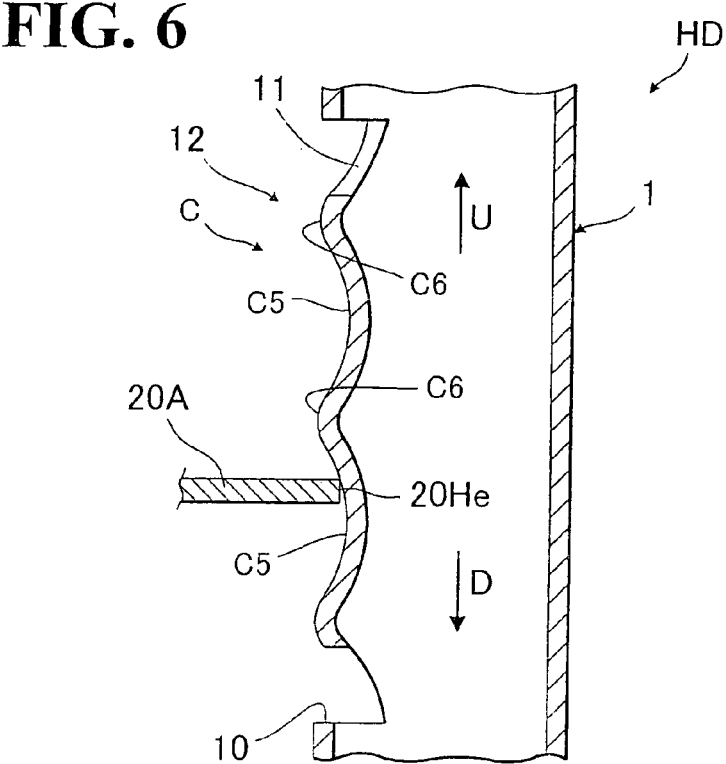
FIG. 6 is a partly broken side view showing a third mode of the headrest device of the present invention.

FIG. 6 shows a third alternative mode of the non-linearly profiled surface region (C). In this mode, a plurality of gently curvilinearly recessed portions (C5) and a plurality of narrow protrudent portions (C6) are alternately defined in the rectilinear lateral surface portion (12) of headrest stay. As shown, such one lateral surface portion (12) is a local area with which the edge (20He) of the lock hole (20H) of lock plate (20A) is in a frictional contact. In this case also, those portions (C5) (C6) are relatively minute and effective in causing change in friction between the lock hole edge (20He) and such uneven portions (C3 and C4), thereby insuring to avoid constant friction therebetween. Therefore, when moving the headrest stay (1) in the upward and downward directions (U) (D), no unpleasant friction noise is generated from contact of the lock hole edge (20He) with the lateral surface portion (12) of the stay (1). Of course, the dimensions of each recessed portion (C5) may be properly set, depending on a thickness of the lock plate (2) and a pitch between the gently curvilinearly recessed portion (C5) and narrow protrudent portion (C6) be properly set, with a view to preventing the generation of objectionable friction noise.

Figure 7:
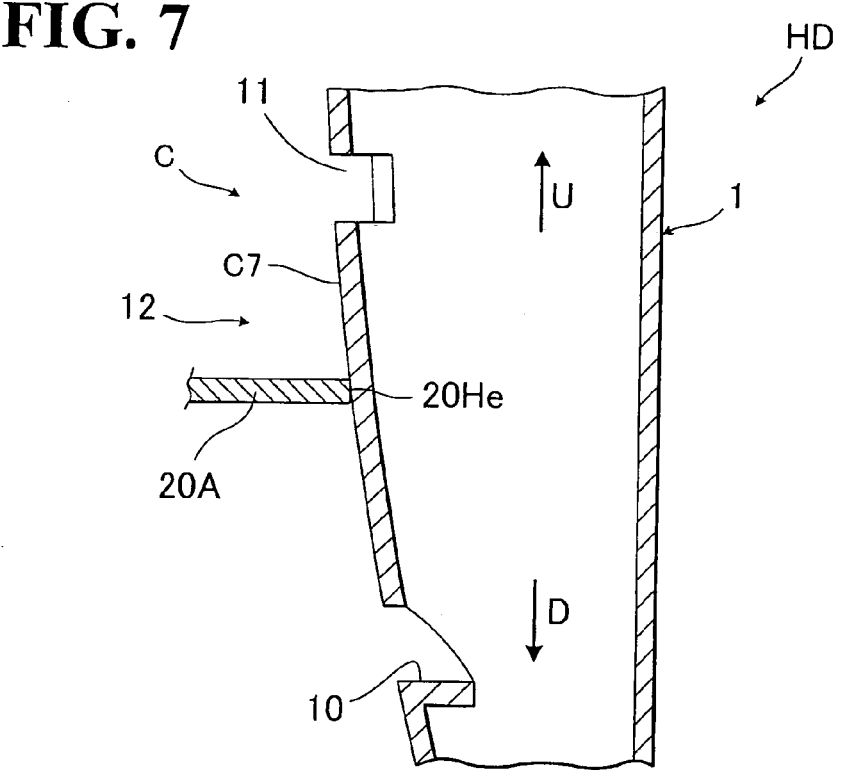
FIG. 7 is a partly broken side view showing a fourth mode of the headrest device of the present invention.

FIG. 7 shows a fourth alternative mode of the non-linearly profiled surface region (C). In the present mode, the non-linearly profiled surface region (C) comprises a downwardly tapered convex surface region (or downwardly curved and outward protrudent surface region) (C7) defined in the rectilinear lateral surface portion (12) of headrest stay. As shown, the edge (20He) of the lock hole (20H) of lock plate (20) is in a frictional contact with such curved surface region (C7). This particular curved surface region (C7) is indeed effective in causing change in friction between the lock hole edge (20He) and that curved portion (C7), thereby insuring to avoid constant friction therebetween. Thus, when moving the headrest stay (1) in the upward and downward directions (U) (D), no unpleasant friction noise is generated from contact of the lock hole edge (20He) with the lateral surface portion (12) of the stay (1).

Figure 8:
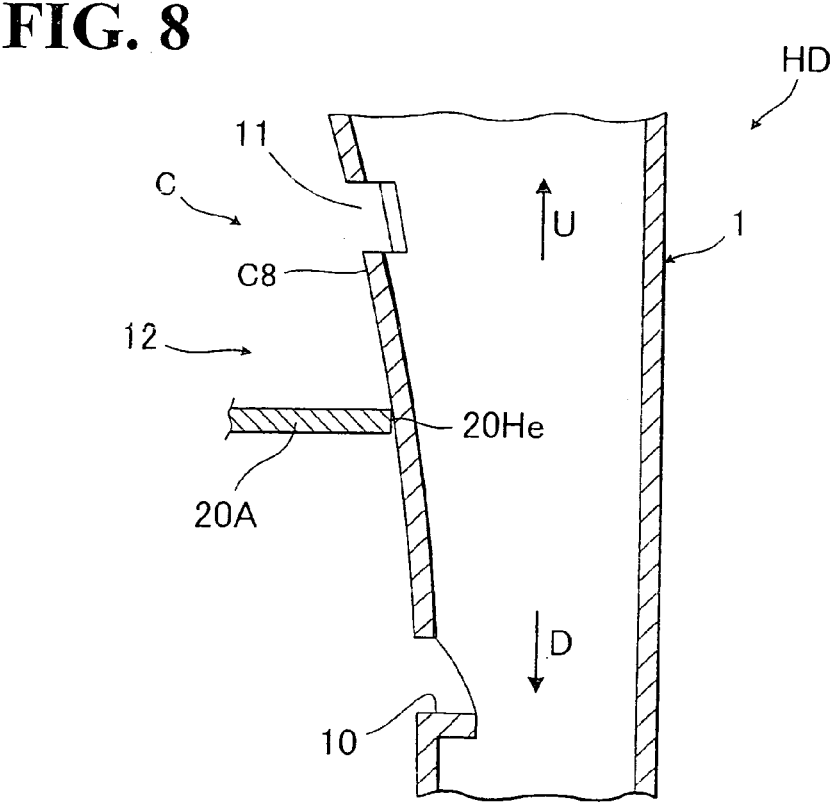
FIG. 8 is a partly broken side view showing a fifth mode of the headrest device of the present invention.

FIG. 8 shows a fifth alternative mode of the non-linearly profiled surface region (C). In the present mode, the non-linearly profiled surface region (C) comprises a downwardly tapered concave surface region (or downwardly tapered and inwardly cured surface region) (C8) defined in the rectilinear lateral surface portion (12) of headrest stay. As shown, the edge (20He) of the lock hole (20H) of lock plate (20A) is in a frictional contact with such convex surface region (C8). This particular surface region (C8) is also effective in causing change in friction with respect to the lock hole edge (20He), thereby insuring to avoid constant friction between the lock hole edge (20He) and that surface region (C8). Thus, when moving the headrest stay (1) in the upward and downward directions (U) (D), no unpleasant friction noise is generated from contact of the lock hole edge (20He) with the lateral surface portion (12) of the stay (1).

In both of the fourth and fifth embodiments, the curvature of one of the downwardly tapered convex and concave surface regions (C7) (C8) may be properly set, depending on a thickness of the lock plate (2) with a view to preventing the generation of objectionable friction noise.

In all the embodiment described above, the non-linearly profiled surface region (C) is just shown as being defined between one lock notch (11) and the removal prevention notch (10), but, this is not limitative, and, not to mention, it is to be understood that the non-linearly profiled surface region (C) is defined between one lock notch (11) and another lock notch (11), though not shown.

While having described the present invention, it should finally be understood that the invention is not limited to the illustrated embodiments, but any other modification, replacement and addition may be applied thereto without departing from the scope of the appended claims.

What is claimed is:

1. A headrest device of a vertically movable type in combination with a seat having a seat back, which comprises:
    a headrest body;
    a stay means for supporting said headrest body upon said seat back, said means having a surface which extends rectilinearly along the longitudinal direction thereof;
    a lock mechanism provided on said seat back, said lock mechanism including:
    at least one first lock notch (11) formed in an upper region of said stay means;
    at least one second lock notch (10) formed in a lower region of said stay means;
    a lock plate movably disposed in the lock mechanism; and
    a biasing means for normally biasing said lock plate to contact with said surface of said stay means, so that said lock plate may be lockingly engaged in one of said at least one first lock notch (11) and said at least one second lock notch (10);
    said stay means being slidably connected with said lock mechanism so as to be movable vertically, thereby allowing said headrest body to be adjusted in height via said stay means respect to said seat back through selective engagement of said lock plate in one of said at least one first lock notch and said at lease one second lock notch; and
    said stay means having a plurality of recessed portions formed in the surface thereof at a region between said at least one first lock notch and said at least one second lock notch, said plurality of recessed portions being minute or small in depth so as to preclude locking engagement between said lock plate and any of said plurality of recessed portions and to only cause a change in friction between said lock plate and said plurality of recessed portions to avoid constant friction therebetween and prevent generation of friction noise when said lock plate is in sliding contact with the surface of said stay means.

2. The headrest device according to claim 1, wherein said plurality of recessed portions are formed in the longitudinal direction of said stay means, and wherein a plurality of protrudent portions are formed in said region of said surface of said stay means in the longitudinal direction of said stay means, in such a manner that said plurality of recessed portions and said plurality of protrudent portions are alternately defined in said particular region.

3. The headrest device according to claim 1, wherein said plurality of recessed portions are formed curvilinearly relative to the rectilinearly extending surface of said stay means, thereby defining a plurality of curvilinearly recessed portions in said region of said surface of said stay means.

* * * * *